US008312475B2

(12) United States Patent
Sareen et al.

(10) Patent No.: US 8,312,475 B2
(45) Date of Patent: Nov. 13, 2012

(54) REMOTE CONTROL OF COMPUTING DEVICES VIA TWO DISPARATE NETWORKS

(75) Inventors: Bhrighu Sareen, Redmond, WA (US); Narayanan Parthasarathy, Redmond, WA (US); Kentaro Toyama, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1389 days.

(21) Appl. No.: 11/861,961

(22) Filed: Sep. 26, 2007

(65) Prior Publication Data

US 2009/0083763 A1 Mar. 26, 2009

(51) Int. Cl.
G06F 9/44 (2006.01)

(52) U.S. Cl. ......... 719/317; 719/315; 709/202; 709/246

(58) Field of Classification Search .................. 719/310, 719/315, 317, 202, 246
See application file for complete search history.

(56) References Cited

U.S. PATENT DOCUMENTS

| | | | |
|---|---|---|---|
| 5,974,449 A * | 10/1999 | Chang et al. ................. | 709/206 |
| 7,010,294 B1 | 3/2006 | Pyotsia et al. | |
| 7,069,003 B2 | 6/2006 | Lehikoinen et al. | |
| 7,272,662 B2 * | 9/2007 | Chesnais et al. ............. | 709/246 |
| 7,321,929 B2 * | 1/2008 | Rolfe ........................... | 709/223 |
| 7,356,046 B2 * | 4/2008 | Harley, Jr. .................... | 370/466 |
| 7,539,291 B2 * | 5/2009 | D'Angelo et al. ......... | 379/88.17 |
| 2003/0191721 A1 | 10/2003 | Fiammante | |
| 2003/0224789 A1 | 12/2003 | Adamany et al. | |
| 2004/0054789 A1 | 3/2004 | Breh et al. | |
| 2004/0156483 A1 * | 8/2004 | Theobald ..................... | 379/88.13 |
| 2004/0194714 A1 | 10/2004 | Lee | |
| 2005/0064852 A1 | 3/2005 | Baldursson | |
| 2005/0273503 A1 | 12/2005 | Carr et al. | |
| 2005/0278371 A1 | 12/2005 | Funk et al. | |
| 2006/0019699 A1 | 1/2006 | Chang et al. | |
| 2006/0111131 A1 * | 5/2006 | Shin et al. ..................... | 455/466 |
| 2006/0179127 A1 | 8/2006 | Randall | |
| 2006/0184612 A1 | 8/2006 | Izdepski et al. | |
| 2006/0212529 A1 | 9/2006 | Choi et al. | |
| 2006/0230112 A1 | 10/2006 | Henderson et al. | |
| 2006/0240856 A1 | 10/2006 | Counts et al. | |
| 2006/0294387 A1 | 12/2006 | McCracken et al. | |
| 2007/0077949 A1 | 4/2007 | Henderson et al. | |
| 2007/0094271 A1 | 4/2007 | Juschkova et al. | |
| 2007/0124372 A1 | 5/2007 | Liu et al. | |

(Continued)

FOREIGN PATENT DOCUMENTS

WO   WO-2006009383   1/2006

(Continued)

OTHER PUBLICATIONS

U.S. Appl. No. 11/760,591, Prasad et al.

(Continued)

Primary Examiner — Van Nguyen
(74) Attorney, Agent, or Firm — Perkins Coie LLP

(57) ABSTRACT

An inter-network remote control system is described that enables remote control of computing devices via two or more disparate data communications networks. In various embodiments, the inter-network remote control system receives a message from a mobile device via a first network, transforms the received message so that it can be relayed via a second network, and forwards the transformed message via the second network to a target computing device to cause that device to be controlled remotely.

15 Claims, 9 Drawing Sheets

U.S. PATENT DOCUMENTS

| | | |
|---|---|---|
| 2007/0174398 A1 | 7/2007 | Addante |
| 2007/0191034 A1 | 8/2007 | Lee et al. |
| 2008/0021963 A1 | 1/2008 | Jana et al. |
| 2008/0028070 A1 | 1/2008 | Gupta |

FOREIGN PATENT DOCUMENTS

| | | |
|---|---|---|
| WO | WO-2006080896 | 8/2006 |
| WO | WO2007004755 | 1/2007 |
| WO | WO-2007037589 | 4/2007 |
| WO | WO-2007058487 | 5/2007 |

OTHER PUBLICATIONS

Chen, Ming-Feng et al., "A mobile service platform using proxy technology," Wireless Communications and Mobile Computing, 2006, vol. 6, pp. 17-34, © 2005 John Wiley & Sons, Ltd.

Jaoude, Nadine Bou et al., "Home Management System using a GPRS-Enabled Mobile Device," http://webfea-lb.fea.aub.edu.lb/proceedings/2004/SRC-ECE-30.pdf, [last accessed Dec. 19, 2007].

Letmeparty.com, Blog via SMS from your Mobile Phone!, © 2006, http://www.letmeparty.com/, [last accessed Jan. 23, 2007].

Leu, Jenq-Shiou et al, "BRAINS: Blog Rendering and Accessing INstantly System,"© 2005 IEEE, IEEE International Conference on Wireless and Mobile Computing, Networking and Communications, Aug. 22-24, 2005, vol. 4, pp. 1-4.

Loeser, Chris et al., "An Adaptable Framework for Remote Tool Monitoring and Control," http://jerry.c-lab.de/vis/loeser/rtmc.pdf, [last accessed Dec. 19, 2007].

Moblogging—Send SMS to Blog, iX Conference Wiki, http://wiki.ixconference.com/moblogging, last modified Jun. 11, 2006, [last accessed Dec. 19, 2007].

Myers, Brad A., "Mobile Devices for Control," Mobile HCI'02, Pisa, Italy, Sep. 18-20, 2002, pp. 1-8, http://www.cs.cmu.edu/~pebbles/papers/pebblesMobileHCI2002.pdf, [last accessed Dec. 19, 2007].

Now Bloggers Can Hit the Road, Wired News, http://www.wired.com/news/wireless/0,1382,57431,00.html,© 2007 CondA© Net Inc., [last accessed Jan. 23, 2007].

International Search Report and Written Opinion, International Application No. PCT/US2008/073604, Filed on Aug. 19, 2008, Applicant: Microsoft Corporation, Mailed on Jan. 5, 2009, 11 pages.

\* cited by examiner

US 8,312,475 B2

REMOTE CONTROL OF COMPUTING DEVICES VIA TWO DISPARATE NETWORKS

BACKGROUND

Computing devices of various types are used worldwide, including in homes and offices of developing countries.

Users of computing devices sometimes need to control their computing devices remotely. As an example, the users may need to reboot their computing devices (e.g., after commanding them to update software or the operating system), record a television program, or take some other action. Computing devices can conventionally be controlled remotely using software-based methods, such as by using remote control software or terminal services (e.g., MICROSOFT TERMINAL SERVER), or by using hardware-based methods, such as with infrared keyboards, mice, and so forth. When using remote control software or terminal services, a user can use a remote computing device to control another computing device remotely and view (or hear) the output of the controlled computing device on the remote computing device. When using infrared keyboards or mice, a user can control a computing device just as if the keyboards or mice were connected via wires to the computing device. Sometimes users may not be able to control their computing devices remotely because they do not have access to a personal computer and are too far away to use infrared keyboards or mice.

Mobile telephones are also commonly used worldwide. Some developing countries have a higher concentration per capita of mobile telephones using cellular networks than landline-based telephones. Short Message Service ("SMS") is a very popular mechanism that mobile telephone users employ to send electronic messages to other users. SMS is often used by users of older mobile telephone technology, such as mobile phones that are not enabled with General Packet Radio Service ("GPRS"). Mobile telephones that are enabled with GPRS can provide advanced digital features, such as Internet browsing, but older mobile telephones that do not provide GPRS cannot provide these advanced digital features. GPRS is unavailable in many areas and very expensive for some people in other areas.

SUMMARY

An inter-network remote control system is described that enables remote control of computing devices via two or more disparate data communications networks. Data communications networks are disparate when they generally communicate using different data communications protocols. The inter-network remote control system can receive a message from a mobile device via a first network (e.g., a cellular telephone network), transform the message so that it can be relayed via a second network (e.g., a transport control protocol/Internet protocol ("TCP/IP")), and forward the transformed message via the second network to a device ("target computing device") to cause that target computing device to be controlled remotely. The message received from the mobile device via the first network can be received in an SMS format (e.g., from a cellular telephone). A converting device can receive the SMS message and convert it to a TCP/IP message that a server then forwards to the target computing device. The target computing device can then take an action indicated in the message and can return a responsive or other message to the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
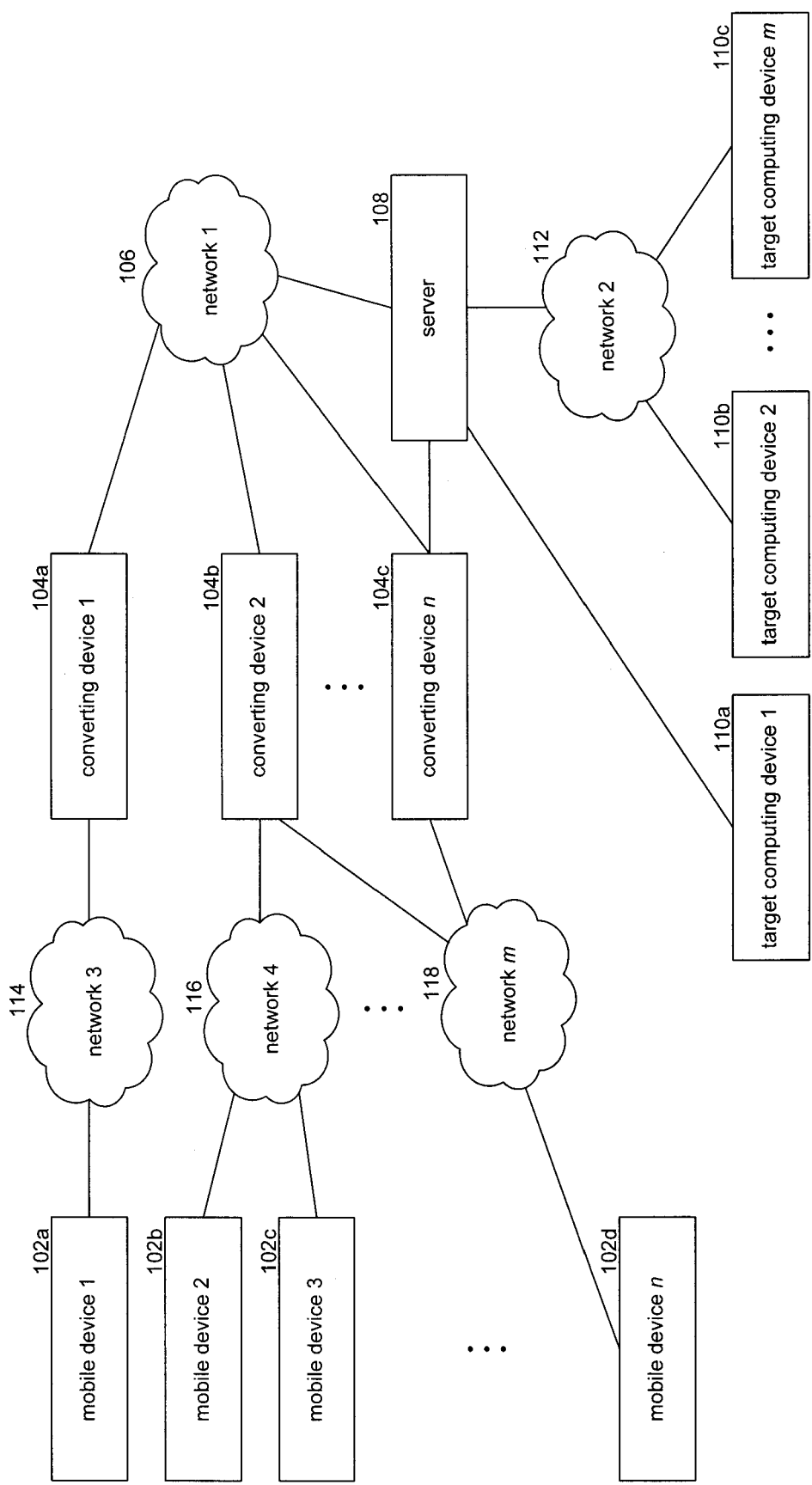
FIG. 1 is a block diagram illustrating an environment in which the inter-network remote control system can operate in some embodiments.

An inter-network remote control system is described that enables remote control of computing devices via two or more disparate data communications networks. Data communications networks are disparate when they generally communicate using different data communications protocols. In various embodiments, the inter-network remote control system receives a message from a mobile device via a first network (e.g., a cellular telephone network), transforms the message so that it can be relayed via a second network (e.g., a transport control protocol/Internet protocol ("TCP/IP")), and forwards the transformed message via the second network to a device ("target computing device") to cause that target computing device to be controlled remotely. The message received from the mobile device via the first network can be received in an SMS format (e.g., from a cellular telephone). As an example, a user can create an SMS message using a mobile device (e.g., a cellular telephone) and send the created SMS message to a network address (e.g., phone number) the user identifies. The network the mobile device connects to forwards the created SMS message to a device connected at the identified network address. A converting device can receive the SMS message and convert it to a TCP/IP message so that a server can then forward it to the target computing device. The converting device can be associated with one or more data communications networks corresponding to mobile devices and can also be associated with one or more data communications networks corresponding to servers and target computing devices. Upon receiving a message from the mobile device via the first network, the converting device (converter) converts the message to the format that will be sent via a second network to the server.

The server can include an associated converter communicator component that receives messages from the converter.

The converter communicator component can then identify a target computing device to which the converted message should be sent. To do so, the converter communicator component can retrieve a network address for the target computing device from an identification database, such as a "PIN database." A PIN database is an identification database that can store various information relating to identification of computing devices in the inter-network remote control system, such as identifications of mobile devices, personal identification numbers ("PINs") or other authentication tokens, network addresses of target computing devices, server computing devices corresponding to mobile devices, and so forth. As an example, when the server receives a message from a mobile device, the converter communicator component can determine the network address of the corresponding target computing device by locating a row in the PIN database corresponding to the network address of the mobile device (e.g., telephone number) and selecting the network address for the target computing device indicated in the target computing device column of that row. In some embodiments, the mobile device provides a token (e.g., a PIN) in one or more messages it sends. The converter communicator component can then provide the message to a target communicator component so that the target communicator component can then send the converted message to the identified target computing device.

An agent component of the target computing device can then receive the converted message. As an example, a service executing on the target computing device can receive the message. The message can contain commands, parameters for those commands, and other information. As an example, the message may indicate to begin backing up a storage device, record a television program, update an operating system component, and so forth. A communicator component associated with the agent can receive the message and provide it to the agent. Upon receiving the message, the agent can identify a corresponding application by employing a command database. The command database can store correspondences between commands and applications. The command database can also store indications of command strings or other information that can be provided to applications that support multiple commands. As examples, the OUTLOOK electronic mail application can support commands for reading and creating messages, and a MEDIA CENTER application can support commands for recording a television program or providing a list of recorded programs. Applications can be configured to invoke an application program interface ("API") associated with the agent. The agent and its API can be installed with the operating system that executes on the target computing device or may be installed later. Applications may register to function with the agent, e.g., to receive and send messages. As examples, applications may send messages indicating that the command could or could not be performed or may initiate messages, such as to indicate that an electronic mail message was received, a program was recorded, and so forth.

When the identified application has processed the command indicated by the message, it can send related information to the mobile device that sent the message. Upon receiving a message from the application, the agent can forward the message via the second network to the target communicator component of the server. The target communicator component can then provide the message from the target computing device to the converter communicator component so that the converter communicator component can forward it to the converting device. The converter communicator component may then identify the converting device to which the message should be sent. The appropriate converting device can be indicated in the message the server receives from the target computing device. As an example, a network location corresponding to the appropriate converting device could have been added to the message sent to the target computing device, which would then indicate that network location in the message that it sent to the server. Alternatively, the message may indicate a network address of the mobile device (e.g., telephone number) to which the message should be sent and the converter communicator can employ the PIN database to identify a corresponding converting device. The server could then forward the message to the converting device.

Upon receiving the message from the server, the converting device can convert the message from the format recognized by the second network to the format recognized by the first network and forward the message to the mobile device. As an example, when using SMS, the converting device may break long messages down into several SMS messages.

In some embodiments, a user can set up filters so that applications can send messages when indicated events occur. As an example, a user can indicate that the target computing device is to send a message to the mobile device whenever the OUTLOOK program receives a message from a selected sender or list of senders.

Several embodiments of the facility are described in more detail with reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the inter-network remote control system. In addition, the data structures and message structures may be stored or transmitted via a data transmission medium, such as a signal on a communications link. Various communications links may be used, such as the Internet, a local area network, a wide area network, a wireless network, or a point-to-point dial-up connection.

In various embodiments, the hardware devices described herein can be implemented as software components and vice versa. In various embodiments, functionality described as being performed by a particular device or component can instead (or additionally) be performed by a different device or component.

FIG. 1 is a block diagram illustrating an environment in which the inter-network remote control system can operate in some embodiments. The environment can include one or more mobile devices 102a, 102b, 102c, . . . 102d. The mobile devices can be computing devices for mobile telephones, such as cellular telephones. The mobile devices can connect via networks 114, 116, . . . 118 to converting devices. These networks can be data communications networks or mobile device communications networks, such as cellular telephone networks. A network can connect with one or more converting devices, and a converting device can connect to one or more networks. As an example, network 114 connects with converting device 104a to enable mobile device 102a to communicate with computing devices via converting device 104a. Similarly, mobile devices 102b and 102c connect via network 116 to converting device 104b for communications with other computing devices.

Converting devices 104b and 104c connect via network 118 to mobile device 102d. The converting devices can communicate via a data communications network, such as network 106, to exchange messages with one or more servers 108. The converter can be associated with one or more identifications, such as a telephone number or network address. As an example, the converting device can include one or more components that enable it to exchange messages with mobile devices and with server computing devices. The converting device can include a modem that enables it to communicate via a mobile device network, such as a cellular telephone network. The converting device can also include a network interface card to enable it to communicate with server computing devices, such as via the Internet or an intranet. The converting device can be connected to the server, for example as a GSM modem attached to the server. The various networks illustrated herein can include telephone communications networks, the Internet, intranets, or other networks.

Although only one server is illustrated, multiple servers may exist in the environment. The converting devices may also connect directly with a server. As examples, converting devices 104a and 104b connect via network 106 to the server 108, whereas converting device 104c connects either via network 106 or directly to the server 108. The server 108 can connect with one or more target computing devices, either directly or via a network. As examples, the server 108 connects directly with target computing device 110a, but it connects with target computing devices 110b and 110c via network 112. The illustrated networks can communicate via various data communications protocols. As examples, networks 106 and 112 may connect via TCP/IP. Various devices may also connect via other messaging protocols, such as SMS or GPRS. As examples, network 114 may connect via SMS, and network 116 may connect via GPRS. The various networks can be intranets, the Internet, or other types of data communications networks.

Figure 2:
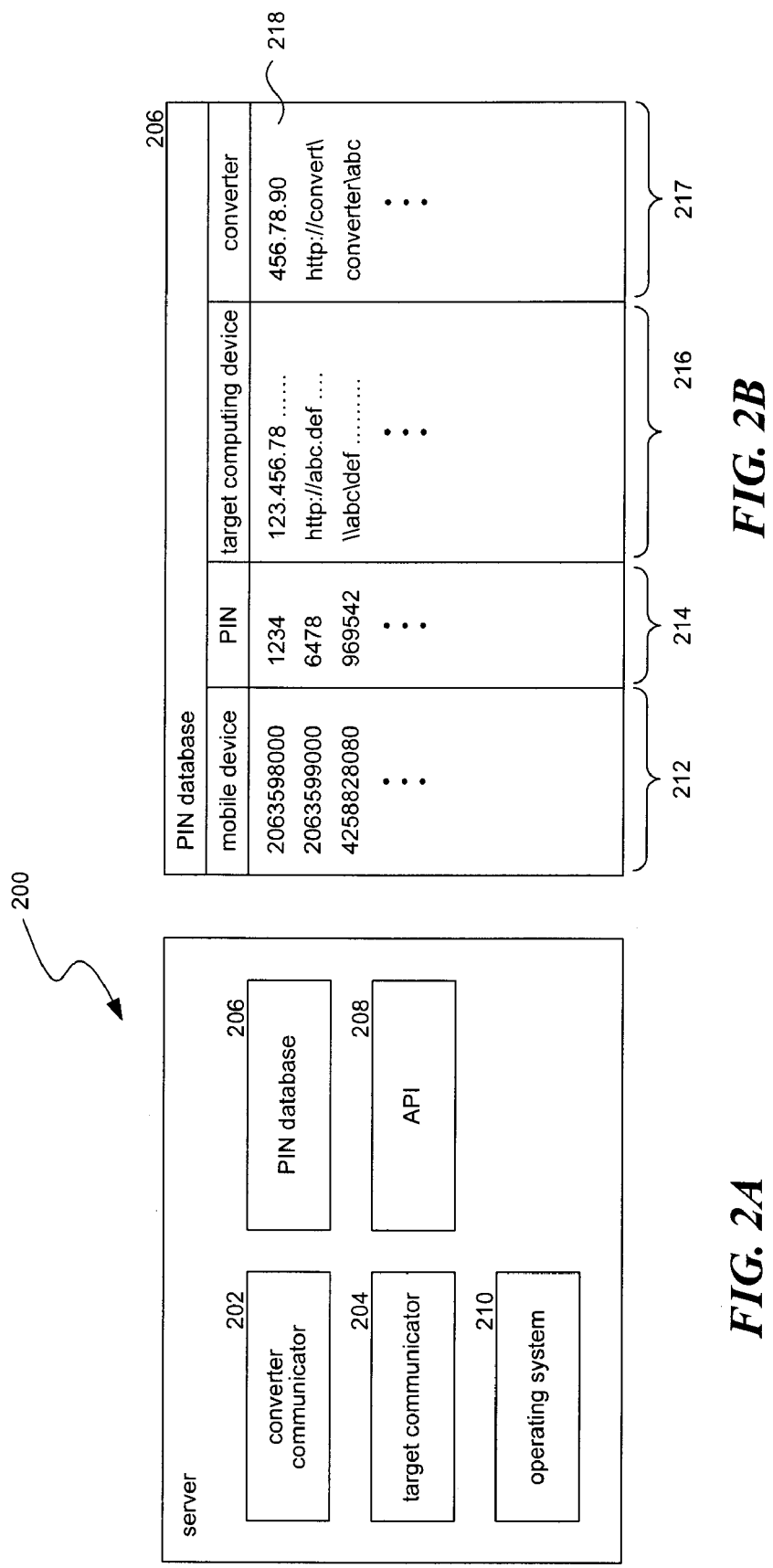
FIGS. 2A and 3A are block diagrams illustrating portions of the inter-network remote control system in various embodiments.
FIGS. 2B and 3B are table diagrams illustrating tables or databases that the inter-network remote control system may employ in various embodiments.

FIG. 2A is a block diagram illustrating a server employed by the inter-network remote control system in some embodiments. The server 200 includes a converter communicator component 202, a target communicator component 204, an authentication database such as a PIN database 206, an application program interface 208, and an operating system 210. The converter communicator is a component that enables communications between a server and a converting device. The target communicator 204 is a component that enables communications between the server and a target computing device. The PIN database 206 is a database that the inter-network remote control system can employ to determine a correspondence between mobile devices and target computing devices and to store authentication tokens. The PIN database can also enable the server to authenticate the mobile computing device by storing authentication tokens. In some embodiments, the PIN database or a portion thereof may also or instead be associated with another component of the inter-network remote control system, such as a converting device or a target computing device. The PIN database is described in further detail below in relation to FIG. 2B. The API can enable applications or other software to function with the inter-network remote control system. As examples, an application can employ the API to receive or initiate communications from other components of the inter-network remote control system, such as a mobile device, target computing device, and so forth. The operating system 210 can be any standard operating system, such as MICROSOFT WINDOWS.

FIG. 2B is a table diagram illustrating a PIN database that the server 200 may employ in some embodiments. The PIN database can have a mobile device column 212, a PIN column 214, a target computing device column 216, and a converter identification column 217. The mobile device column can identify a mobile device, such as a cellular telephone, by its cellular telephone number. In various embodiments, the mobile device may be identified using other identifications, such as network identifications or addresses. The PIN column 214 may store an identifier associated with a user or mobile device or an authentication token. As an example, a user of a particular mobile device may send the corresponding PIN in a message to enable the server to authenticate the user. The target computing device column 216 stores an identification of a target computing device associated with the mobile device. The target computing device can be identified by its network identification or address. As an example, row 218 associates a mobile device with telephone number 2063598000 with a target computing device having a network identification 123.456.78. The converter column 217 can be used to associate converters to mobile devices, such as when the server receives a message from a target computing device. While FIG. 2B and FIG. 3B show tables whose contents and organization are designed to make them more comprehensible by a human reader, those skilled in the art will appreciate that actual data structures used by the facility to store this information may differ from the tables shown, in that they, for example, may be organized in a different manner, may contain more or less information than shown, may be compressed and/or encrypted, etc.

Figure 3:
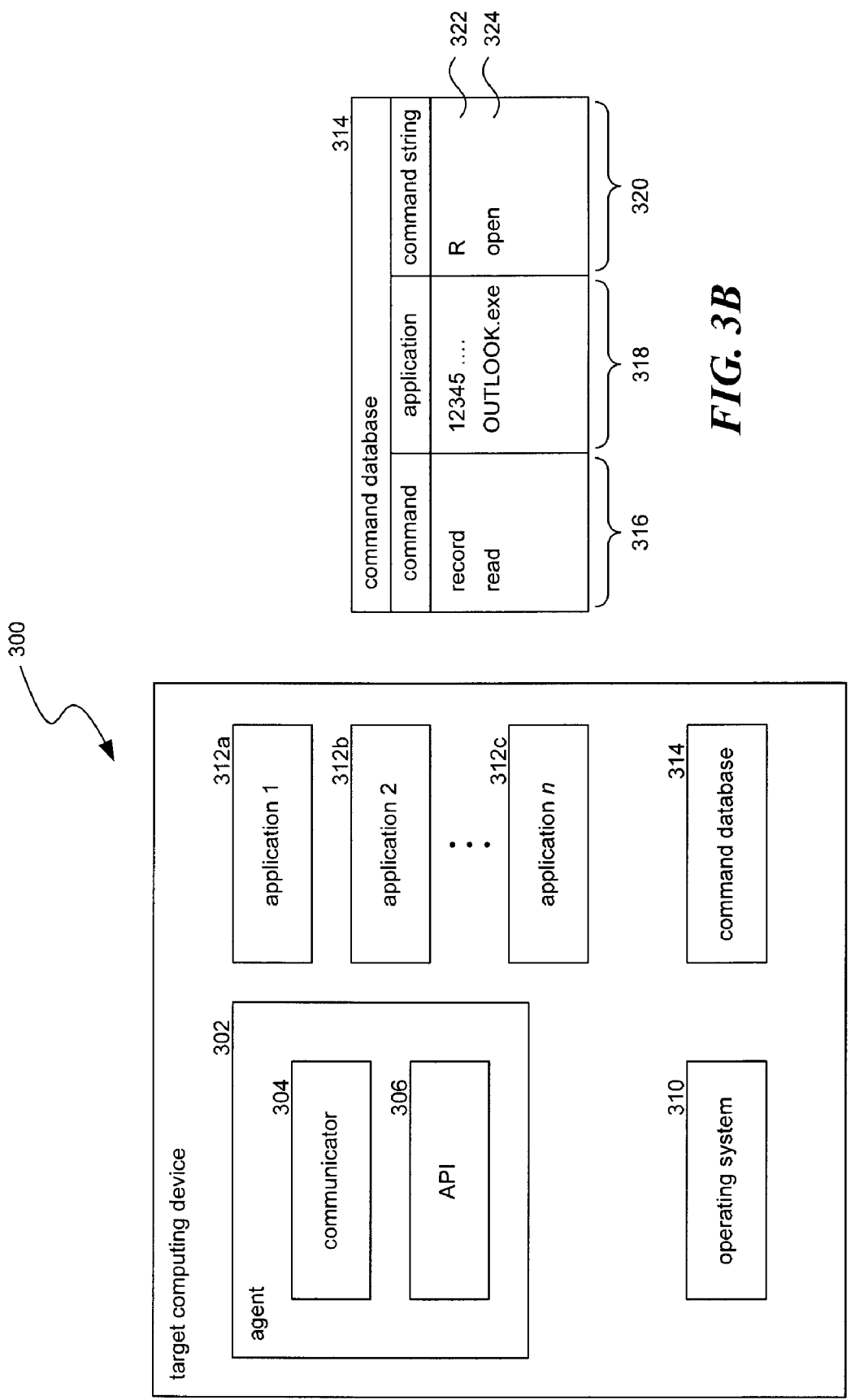

FIG. 3A is a block diagram illustrating portions of the inter-network remote control system in various embodiments. A target computing device 300 includes an agent component 302, one or more applications 312 (e.g., applications 312a, 312b, . . . 312c), an operating system 310, and a command database 314. The agent 302 is a component that can receive communications from a server, respond to such communications, or initiate communications with the server. The agent can also take various actions based on commands that the target computing device receives in messages from the server or can cause such actions to be taken. The agent includes a communicator component 304 and an API 306. The communicator component can receive messages or create and send messages. As an example, the communicator component can receive messages from a server and translate the messages to take various actions. Alternatively, the communicator component can create messages when an application invokes a method of the API 306. An application can employ the API 306 to register itself with the inter-network remote control system so that the application can receive commands or send messages to a user of a mobile device. In various embodiments, the agent 302 can be installed by a user or may be installed automatically with the operating system 310. The operating system 310 can be any standard operating system, such as MICROSOFT WINDOWS. The command database 314 is described in further detail immediately below in relation to FIG. 3B.

FIG. 3B is a table diagram illustrating a command database that the inter-network remote control system employs in some embodiments. The command database 314 can include a command column 316, an application column 318, and a command string 320. The command column can include a list of commands that the agent 302 can respond to, such as by requesting an application or other operating system component to take an action. These commands can be installed with the agent or may be added when applications register with the inter-network remote control system. Each command can be associated with an application and a command screen. The application is an application that the inter-network remote control system requests to take an action. The action can be identified by the command string. The action may also include one or more parameters, such as parameters specified in a message that the target computing device receives from the mobile device. As an example, row 322 of the command database includes a command to record a program. The application is identified by a globally unique identifier. The command string is an "R" to begin recording. The message the target computing device receives may indicate a channel number, a time, and a duration. When the target computing device receives such a command, it may store in its calendar an indication that the identified channel number is to be tuned and recorded at the identified time and for the identified duration. Row 324 of the command database identifies a "read" command corresponding to an OUTLOOK.exe program. When the target computing device receives this command, it may open an electronic mail message using the OUTLOOK program.

Figure 4:
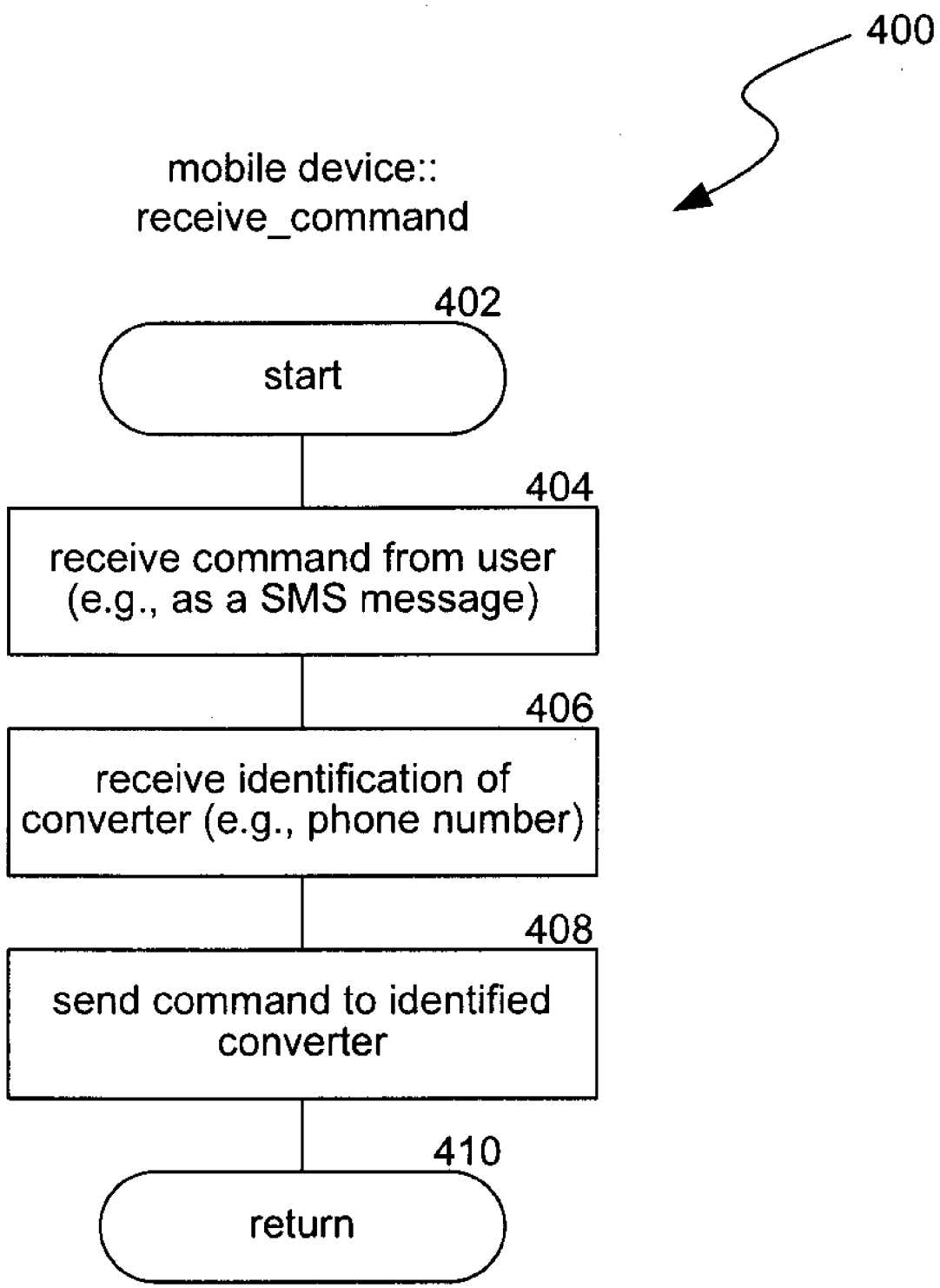
FIG. 4 is a flow diagram illustrating a receive_command routine invoked by a mobile device in some embodiments.

FIG. 4 is a flow diagram illustrating a receive_command routine invoked by a mobile device in some embodiments. A mobile device can invoke the receive_command routine 400 when it receives a command from a user, such as in an SMS message. The routine begins at block 402. At block 404, the routine receives a command from a user, such as in an SMS message. The routine may receive the command in other message formats. The routine may receive the message when the user composes a message and indicates to send it. In general, a user of a mobile device indicates a destination for the message, such as a destination telephone number or a destination network address. At block 406, the routine receives this identification. The identification corresponds to a converting device that the mobile device is to send a message to. At block 408, the routine sends the message including the command to the identified converting device. At block 410, the routine returns.

Those skilled in the art will appreciate that the logic illustrated in FIG. 4 and described above, and in each of the flow diagrams discussed below, may be altered in a variety of ways. For example, the order of the logic may be rearranged, substeps may be performed in parallel, illustrated logic may be omitted, other logic may be included, etc. Moreover, logic within each flow diagram can be combined with logic illustrated in other flow diagrams.

Figure 5:
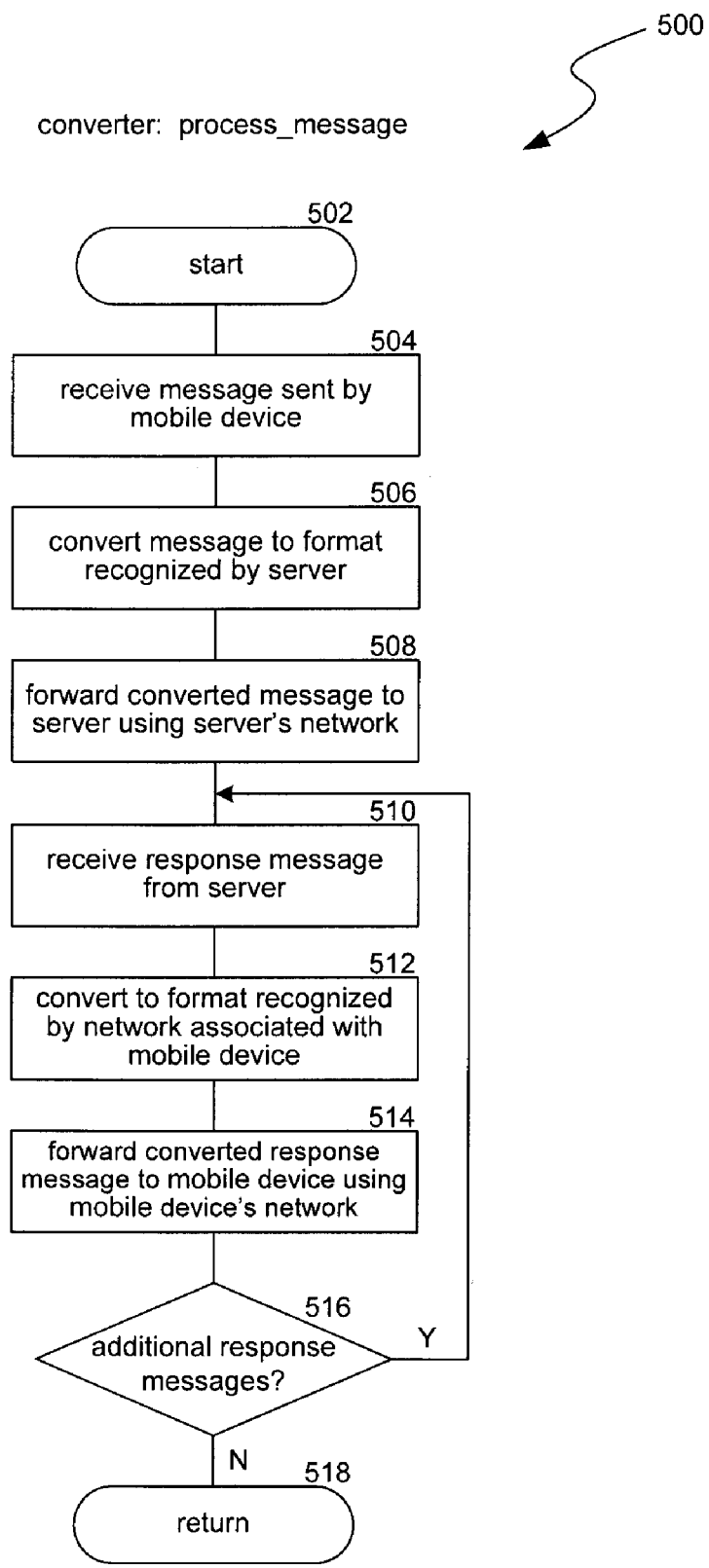
FIG. 5 is a flow diagram illustrating a process_message routine invoked by a converter in some embodiments.

FIG. 5 is a flow diagram illustrating a process_message routine invoked by a converter (converting device) in some embodiments. A converter can invoke the process_message routine 500 when it receives a message from a mobile device. The routine begins at block 502. At block 504, the routine receives a message that is sent by a mobile device. The message can be in various formats, such as in an SMS format. At block 506, the routine converts the received message into a format that is recognized by a server computing device. As an example, although the routine may receive a message in an SMS format, it may create a TCP/IP message in which to place the received command. At block 508, the routine forwards the converted message to a server computing device using a network that is associated with the server. As an example, although the converting device may receive the message via a cellular telephone network, it may forward the converted message using a TCP/IP network, such as the Internet. At block 510, the routine receives a response message from a server. As an example, the routine may receive an acknowledgment from the server computing device that it has received a message that the converter has sent. Alternatively, the routine may receive an indication from the server computing device that the command sending the message has been handled or has been rejected. At block 512, the routine converts the received response message from the server into a format that is recognized by the handheld device from which the converter received the message. As an example, the routine may convert a message from the TCP/IP format to the SMS format. At block 514, the routine forwards the converted response message to the handheld device using a network associated with the handheld device. At decision block 516, the routine determines whether (a) additional response messages have been received or (b) additional response messages are being awaited. In either case, the routine continues at block 510. Otherwise, the routine returns at block 518.

Figure 6:
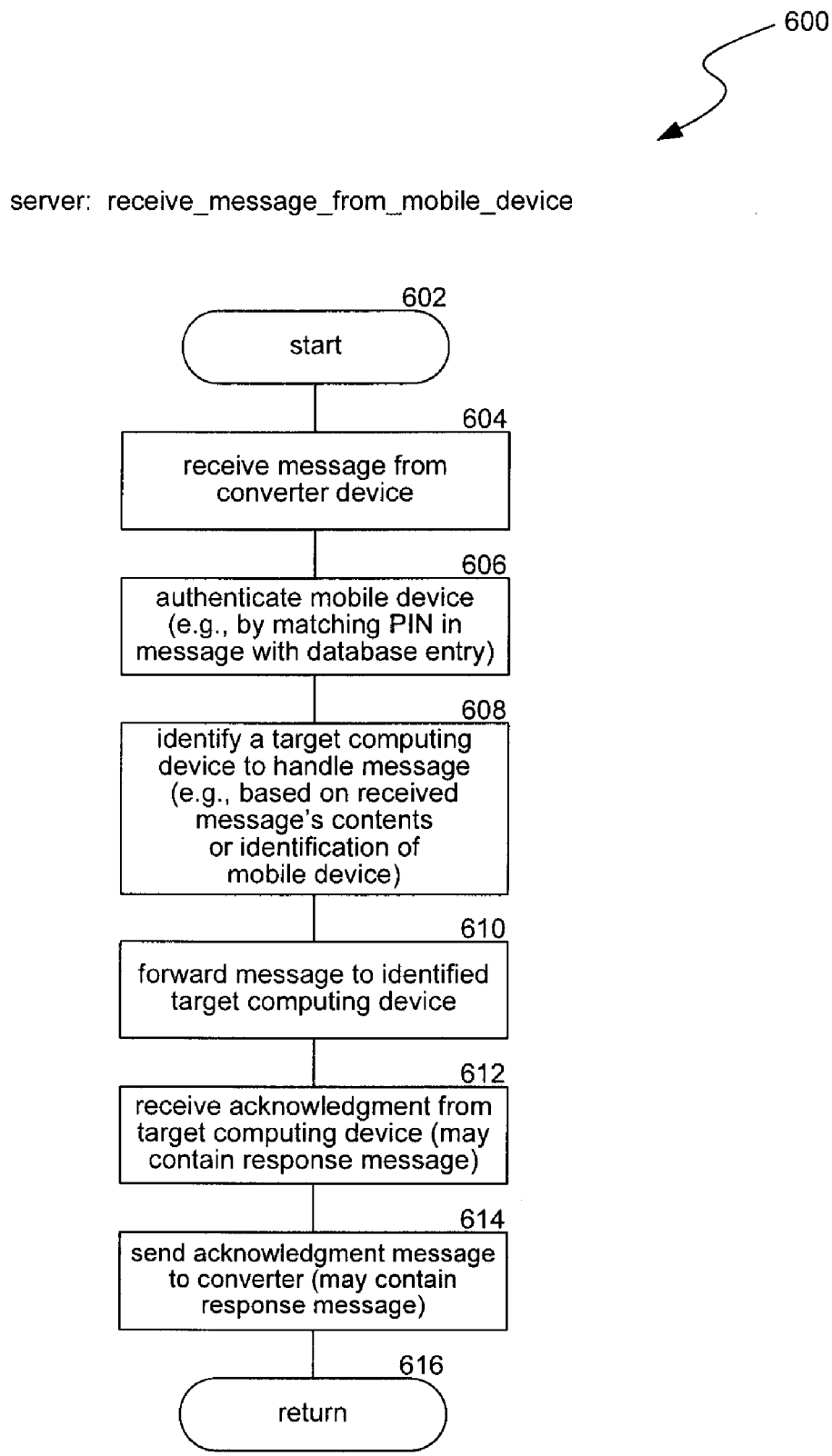
FIG. 6 is a flow diagram illustrating a receive_message_from_mobile_device routine invoked by a server in some embodiments.

FIG. 6 is a flow diagram illustrating a receive_message_from_mobile_device routine invoked by a server in some embodiments. A server computing device may invoke the receive_message_from_mobile_device routine 600 when it receives a message. The routine begins at block 602. At block 604, the routine receives a message from a converting device. At block 606, the routine authenticates the handheld device that sent the message, such as by matching a personal identifier or other token in the message with a database entry. As an example, the message may include an identifier for the mobile device that sent the message and a PIN. Upon receiving the message, the routine can authenticate the handheld device by determining whether the supplied PIN (or other authentication token) corresponds to the PIN listed in the PIN database corresponding to the mobile device that sent the message. At block 608, the routine identifies a target computing device to handle the message. As an example, the routine can identify from the PIN database the target computing device that corresponds to the mobile computing device that sent the message. According to the PIN database 206 illustrated in FIG. 2B, a network identification associated with a uniform resource locator identified by abc.def corresponds to a mobile device with telephone number 206-359-9000. At block 610, the routine forwards the message to the identified target computing device. At block 612, the routine may receive an acknowledgment from the target computing device. This acknowledgment may contain a response message. At block 614, the routine may send an acknowledgment message to the converting device. This acknowledgment may include a response that is received from the target computing device. At block 616, the routine returns.

In various embodiments, the inter-network remote control system may use various tokens to identify or to authenticate devices. As examples, the inter-network remote control system can use network addresses, network names, personal identification numbers, or any other type of token.

Figure 7:
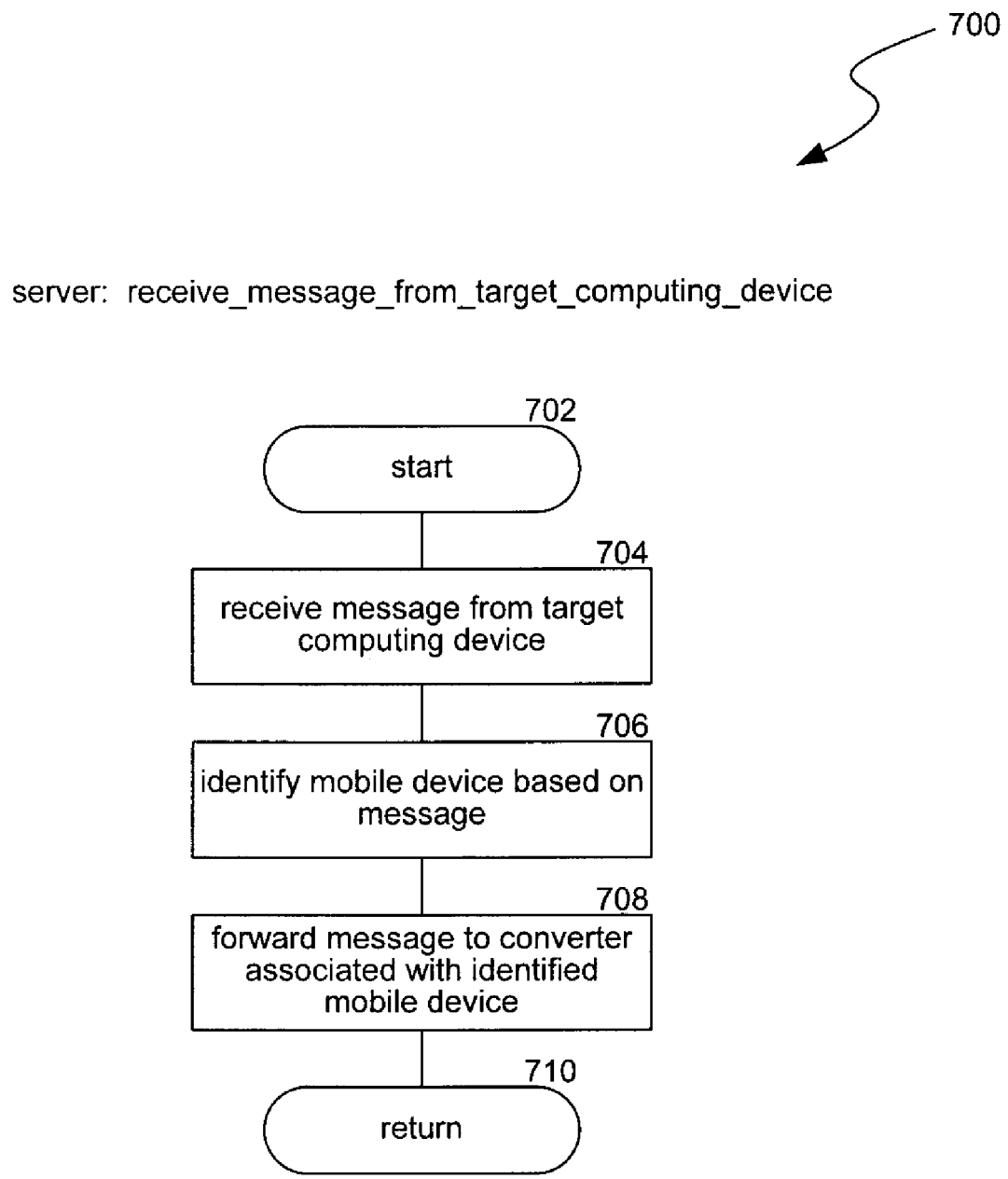
FIG. 7 is a flow diagram illustrating a receive_message_from_target_computing_device routine invoked by a server in some embodiments.

FIG. 7 is a flow diagram illustrating a receive_message from_target_computing_device routine invoked by a server in some embodiments. The server computing device can invoke the routine 700 when it receives a message from a target computing device. As an example, the server may invoke the message when an application executing at the target computing device requests a message to be sent to a mobile device and the target computing device forwards the message to the server. The routine begins at block 702. At block 704, the routine receives a message from a target computing device. At block 706, the routine identifies the target computing device based on the message. As an example, the routine may identify a network address that sent the address. Alternatively, the message may include an identification of the target computing device that sent the message. At block 708, the routine forwards the received message to a converting device that is associated with the identified handheld device. As an example, the routine may determine based on the identification of the target computing device an identification of the mobile device that is to receive the message based on the information stored in the PIN database. At block 710, the routine returns.

Figure 8:
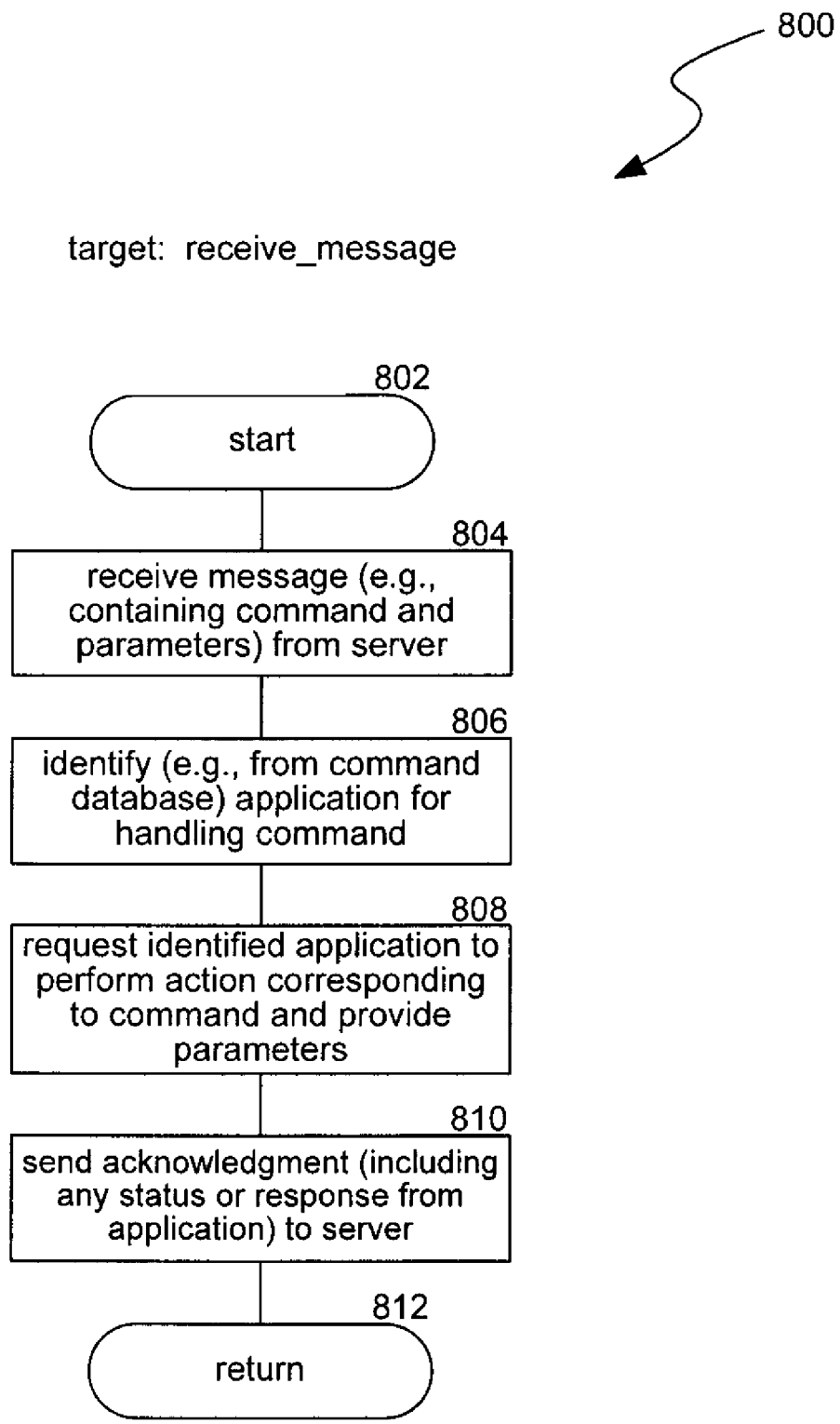
FIG. 8 is a flow diagram illustrating a receive_message routine invoked by a target computing device in some embodiments.

FIG. 8 is a flow diagram illustrating a receive_message routine invoked by a target computing device in some embodiments. A target computing device can invoke the receive_message routine 800 when it receives a message, such as from a server computing device. The routine begins at block 802. At block 804, the routine receives a message, such as a message containing a command and parameters associated with the command, from a server computing device. At block 806, the routine identifies an application for handling the command. As an example, the routine may determine from a command database an application that is associated with the command that is identified by the message. At block 808, the routine requests the identified application to perform an action corresponding to the command and provides to the application any parameters that were received with the message. As an example, upon receiving a command to begin recording of a television program, the routine may invoke a function provided by MICROSOFT MEDIA CENTER to schedule the television recording. At block 810, the routine sends an acknowledgment to the server computing device that sent the message to the target computing device. As an example, the acknowledgment may include a status or a response that is received from the application. At block 812, the routine returns.

Figure 9:
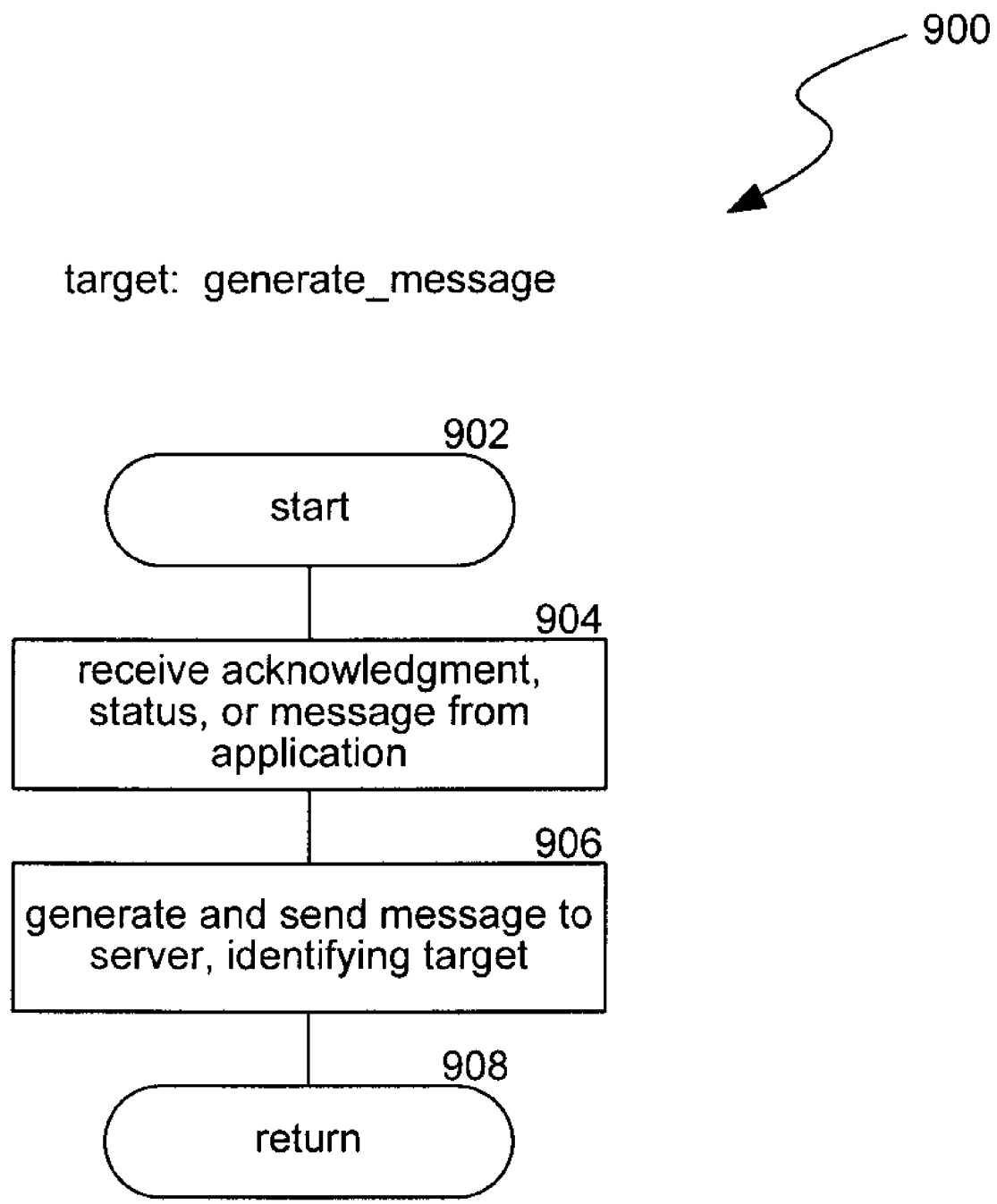
FIG. 9 is a flow diagram illustrating a generate_message routine invoked by a target computing device in some embodiments.

FIG. 9 is a flow diagram illustrating a generate_message routine invoked by a target computing device in some embodiments. The target computing device can invoke the generate_message routine 900 when an application indicates to send a message. As an example, an operating system component may send a message indicating that a new update (e.g., a "critical" update) is available and should be installed. Alternatively, an application that was previously commanded to perform an action may indicate that the action was successfully or unsuccessfully completed. The routine begins at block 902. At block 904, the routine receives an acknowledgment, status, or other message from an application. As an example, the routine may receive this acknowledgment, status, or other message via a method provided by an API associated with the inter-network remote control system. At block 906, the routine generates and sends a message to a server computing device. The message can include an identification of the target computing device that is sending the message. The routine can also include the acknowledgment, status, or other message from the application. At block 908, the routine returns.

In various embodiments, the routines described herein can be modified in various ways. As examples, additional logic can be combined, some logic can be ignored, logic associated with the blocks can be performed in a different order than illustrated, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for remotely controlling a computing device via two disparate networks, comprising:
receiving a command to send to a remote computing device;
employing a cellular telephone network using a first data communications protocol to send the command in a Short Message Service (SMS) format to an intermediate computing device that converts the command into a second message format that the intermediate computing device sends to the remote computing device via a second data communications network using a TCP/IP protocol that is different from the first data communications protocol so that the remote computing device can perform an action indicated by the command;
receiving a parameter for the command; and
causing the remote computing device to identify software associated with the command and transferring the command to the identified software to process the command, wherein the software is an operating system and the command causes the operating system to invoke an operating system function.

2. The method of claim 1, further comprising receiving an acknowledgment indicating that the action was performed.

3. The method of claim 1, further comprising sending an authentication token.

4. The method of claim 3 wherein the authentication token is a personal identification number.

5. A computer-readable storage device storing computer-executable instructions that, when executed, cause a computing system to perform a method for remotely controlling a computing device via two data communications networks, the method comprising:
receiving a message in a Short Message Service (SMS) format via a first data communications network, the message containing a command and identifying a mobile device that sent the message;
identifying a target computing device based on the identification of the mobile device from which the message was received;
converting the received message into a TCP/IP format that is different from the SMS format;
sending the converted message to the identified target computing device via a second data communications network that is different from the first data communications network so that the target computing device can perform an action based on the command;
receiving a parameter for the command; and
causing the target computing device to identify software associated with the command and transferring the command to the identified software to process the command, wherein the software is an operating system and the command causes the operating system to invoke an operating system function.

6. The computer-readable storage device of claim 5 wherein the method further comprises receiving an acknowledgment from the target computing device indicating a status relating to the action.

7. The computer-readable storage device of claim 5 wherein the method further comprises authenticating the received message by determining whether the received message contains an authentication token.

8. The computer-readable storage device of claim 5 wherein the identifying includes selecting a target computing device from multiple target computing devices and wherein the target computing device is previously associated with the mobile device.

9. The computer-readable storage device of claim 5, wherein the software is an application executing on the target computing device and the command causes the application to respond with an indication that the command could not be completed successfully.

10. A system for remotely controlling a computing device via two data communications networks, comprising:
a processor and one or more memories;
an agent component configured for use with a target computing device that receives commands in a Short Message Service (SMS) format from a mobile device, determines an action based on the command received from the mobile device, and causes the action to be performed corresponding to the received command; and a communicator component that is configured for use with the agent component to exchange messages via a first network with a server computing device so that the server computing device can exchange corresponding messages via a second network with the mobile device, wherein the target computing device receives in a TCP/IP format commands from the mobile device originally sent in the SMS format and sends notifications to the mobile device, wherein when the agent receives a parameter for command, the agent identifies one of multiple components associated with the command and directs the identified component to take an action corresponding to the command, and wherein the identified component is an operating system and the command causes the operating system to invoke an operating system function.

11. The system of claim 10, further comprising a memory storing a relationship between the received command and components that can perform an action corresponding to the received command.

12. The system of claim 10, further comprising an application that can perform the action corresponding to the received command.

13. The system of claim 10 wherein the agent component is an operating system service.

14. The system of claim 10 wherein the agent component includes an application program interface.

15. The system of claim 14 wherein an application employs the application program interface to register itself with the system, receive a message, or send a message.

* * * * *